US 7,980,053 B2

(12) United States Patent
Yakushi et al.

(10) Patent No.: US 7,980,053 B2
(45) Date of Patent: Jul. 19, 2011

(54) TURBINE STARTING CONTROLLER AND TURBINE STARTING CONTROL METHOD

(75) Inventors: Koji Yakushi, Tokyo (JP); Akimasa Nakai, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1337 days.

(21) Appl. No.: 11/375,599

(22) Filed: Mar. 15, 2006

(65) Prior Publication Data

US 2006/0233637 A1     Oct. 19, 2006

(30) Foreign Application Priority Data

Mar. 16, 2005  (JP) ................................ P2005-074344

(51) Int. Cl.
    *F01K 13/02*         (2006.01)
(52) U.S. Cl. ................ 60/39.3; 60/775; 60/646; 60/656
(58) Field of Classification Search .................... 60/646, 60/657, 664, 665, 667, 773, 39.3, 775, 647, 60/656, 658
    See application file for complete search history.

(56) References Cited

U.S. PATENT DOCUMENTS

| 3,358,450 A | * | 12/1967 | Schroedter et al. ............. 60/646 |
| 3,532,079 A | * | 10/1970 | Chambert .................. 122/406.5 |
| 4,215,552 A |   | 8/1980  | Riollet et al. |
| 4,320,625 A |   | 3/1982  | Westphal et al. |
| 5,042,246 A | * | 8/1991  | Moore et al. ..................... 60/773 |
| 5,136,848 A |   | 8/1992  | Silvestri, Jr. |
| 5,333,457 A | * | 8/1994  | Silvestri, Jr. .................... 60/646 |
| 5,433,079 A | * | 7/1995  | Badami et al. .................. 60/660 |
| 6,239,504 B1 |  | 5/2001  | Gobrecht et al. |
| 2003/0230088 A1 | | 12/2003 | Wolf |

FOREIGN PATENT DOCUMENTS

| EP | 1 365 110 A1 | 11/2003 |
| JP | 56-098507 A  | 8/1981  |
| JP | 59-226211 A  | 12/1984 |
| JP | 09-317404 A  | 12/1997 |
| WO | WO 98/21451 A1 | 5/1998 |

* cited by examiner

*Primary Examiner* — Michael Cuff
*Assistant Examiner* — Vikansha S Dwivedi
(74) *Attorney, Agent, or Firm* — Foley & Lardner LLP (57) ABSTRACT

A turbine starting controller includes: an optimum starting control unit for predicting, while taking as a variable a turbine acceleration rate/load increase rate as a directly manipulated variable, thermal stress generated in a turbine rotor over a prediction period from a current time to the future, calculating for each control cycle a manipulated variable optimum transition pattern in the prediction period which makes a turbine starting time shortest while keeping the predicted thermal stress equal to or lower than a prescribed value, and determining as an actual optimum manipulated value a value at the current time in the manipulated variable optimum transition pattern; and an rpm/load control unit to which the optimum manipulated variable from the optimum starting control unit is input, for controlling the drive of control valves.

11 Claims, 6 Drawing Sheets

TURBINE STARTING CONTROLLER AND TURBINE STARTING CONTROL METHOD

BACKGROUND OF THE INVENTION

1. Field of the Invention

The present invention relates to a turbine starting controller capable of starting a turbine in the shortest time while keeping the thermal stress in a turbine rotor to a prescribed value or less and also relates to a turbine starting control method.

2. Description of the Related Art

In general, upon starting a steam turbine, the surface metal temperature of a turbine rotor rises as the heat transfer rate between the steam and the rotor improves due to a rise in the temperature of inflow steam and an increase in steam flow. The temperature of the inner portion of the turbine rotor rises due to the conduction of heat from the rotor surface at a timing delayed from the rise in the surface temperature. A deviation thus occurs in the temperature distribution in the inner portion of the turbine rotor, which will cause thermal stress. Since excessive thermal stress significantly reduces the life of the turbine rotor, the value of the generated thermal stress must be suppressed to an appropriate value or lower.

On the other hand, rapid and frequent start/stop operations are required of steam turbines in power generation plants in recent years. Unnecessarily rapid starting of the turbine may cause excessive thermal stress to be exerted on the turbine rotor. Accordingly, at the start of the steam turbine, a turbine starting control is required so as to make the consumption of rotor's life for one turbine startup appropriate while keeping the thermal stress on the turbine rotor within a limit value (prescribed value).

Further, it is known that the life consumption for one startup of the steam turbine can be grasped from the magnitude and the number of times of the thermal stress peaks at that time.

Japanese Patent Laid-open (KOKAI) Publication No. HEI 9-317404 describes a device for controlling the starting of a steam turbine so as to minimize the starting time of the steam turbine by limiting the thermal stress on the turbine rotor to a prescribed value or less.

In order to achieve optimized starting of the steam turbine, the turbine starting controller disclosed includes optimum pattern computing means, thermal stress predicting means, pattern correcting means, and manipulated variable adjusting means, forming a cascaded structure in which the calculated value computed by the optimum pattern computing means, the thermal stress predicting means, and the pattern correcting means serves as the set value for the manipulated variable adjusting means.

The conventional turbine starting controller is endowed with a thermal stress prediction starting control function for feedback-calculating the manipulated variable in the manipulated variable adjusting means so that, with the optimum rotor surface temperature transition pattern calculated on the basis of the predicted thermal stress serving as the set value, the measured value of plant state variables such as the temperature of the turbine rotor matches the set value. A drive control is performed on a flow rate adjusting valve by a turbine controller on the basis of the manipulated variable from the manipulated variable adjusting means, thereby controlling the starting of the steam turbine.

In the conventional turbine starting controller, the object of optimization calculation is the plant state variable such as the first stage metal temperature of the turbine rotor or the like, and the manipulated variable adjusting means is provided to calculate the turbine acceleration rate/load increase rate as the final manipulated variable. However, it is difficult to determine the manipulated variable (turbine acceleration rate/load increase rate) from a deviation in plant state variable, which may make it impossible to attain satisfactory optimization performance.

While the P control or the PI control is generally contemplated for the determination of the manipulated variable by the manipulated variable adjusting means, it is difficult to theoretically determine the control gain for computing the turbine acceleration rate/load increase rate as the final manipulated variable from a deviation in plant state variable.

Accordingly, with the starting control for the steam turbine according to which the drive of the control valve is controlled by the turbine controller on the basis of the manipulated variable computed by the manipulated variable adjusting means, it is difficult to match the plant state variable with the plant state variable set value obtained through the optimization calculation without time delay, which disadvantageously makes the original object of starting the turbine in the shortest time difficult to achieve in a satisfactory manner.

Further, in the conventional turbine starting controller, the optimum transition pattern for the plant state variable over a predetermined prediction period from the present to the future is calculated by the optimum pattern computing means, and the computed value (set value) at the current time in the computed optimum transition pattern is used for the determination of the manipulated variable by the manipulated variable adjusting means. Accordingly, the optimization calculation in the optimum pattern computing means is a calculation in which the plant state variable in each time step over the prediction period from the current time to the future is taken as a variable, so that if the prediction period consists of m steps, it means that the calculation is to be conducted for an m-variables optimization problem. Calculations involving multivariable optimization result in extremely high computational load (computational complexity), and the high computational complexity makes application to commercialization, that is, application to the actual turbine controllers difficult.

SUMMARY OF THE INVENTION

The present invention was conceived so as to substantially eliminate defects or drawbacks encountered in the prior art mentioned above and an object of the present invention is to provide a turbine starting controller and a starting control method for the turbine starting controller, capable of performing prediction on the thermal stress in the turbine rotor while taking as a variable the turbine acceleration rate/load increase rate that is a directly manipulated variable, and performing optimization calculation on the basis of the predicted thermal stress, thereby achieving improved accuracy of the optimum starting control for the turbine and also allowing a manipulated variable of high accuracy and reliability to be obtained.

It is another object of the present invention to provide a turbine starting controller and a starting control method for the turbine starting controller, according to which the optimization calculation is simplified by reducing the variables for the optimization calculation through an optimization calculation that assumes a constant turbine acceleration rate/load increase rate, thereby allowing the optimum manipulated variable to be quickly obtained with relatively little computational complexity.

It is a further object of the present invention to provide a turbine starting controller and a starting control method for the turbine starting controller, which makes it possible to obtain a highly accurate manipulated variable of a quasi-optimum solution through straightforward, deterministic calculation without using a repetitive calculation, by calculating the maximum value of the predicted thermal stress with respect to the turbine acceleration rate/load increase rate at each of a plurality of preset points and performing inverse operation to obtain the optimum turbine acceleration rate/load increase rate through linear interpolation.

In order to solve the above-mentioned problems, according to the present invention, there is provided a turbine starting controller for adjusting and controlling an amount of steam or gas flowing into a turbine using a control valve, the controller including: an optimum starting controlling unit for predicting, while taking as a variable a turbine acceleration rate/load increase rate as a directly manipulated variable, thermal stress generated in a turbine rotor over a prediction period from a current time to a future, calculating for each control period a manipulated variable optimum transition pattern in a prediction period which makes a turbine starting time shortest while keeping the predicted thermal stress equal to or lower than a prescribed value, and determining, as an actual optimum manipulated value, a value at the current time in the manipulated variable optimum transition pattern; and an rpm/load controlling unit to which the optimum manipulated variable from the optimum starting controlling unit is input, for controlling actuation of the control valve.

In the preferred embodiments of the above aspect of the present invention, the optimum starting controlling unit may include: heat transfer rate predicting means for predicting a heat transfer rate over the prediction period from the present to the future, with a directly manipulated variable of a turbine acceleration rate/load increase rate being taken as a variable; first stage metal temperature predicting means for predicting a rate of change of first stage metal temperature in the prediction period on the basis of the predicted heat transfer rate from the heat transfer rate predicting means and a measured first stage metal temperature at the current time; thermal stress predicting means for predicting the thermal stress generated in the turbine rotor on the basis of the predicted rate of change of first stage metal temperature from the first stage metal temperature predicting means; and optimization calculating means for calculating, for each control period, the manipulated variable optimum transition pattern in the prediction period which makes the turbine starting time shortest while keeping the predicted thermal stress equal to or lower than the prescribed value under a constraint of operating conditions of a power plant, and the optimization calculating means is configured to determine as the actual optimum manipulated variable the value at the current time in the manipulated variable optimum transition pattern.

Furthermore, the optimum starting controlling unit may further include first stage steam temperature predicting means for predicting a first stage steam temperature over the predetermined prediction period from the present to the future.

Furthermore, the optimum starting controlling unit may form a closed optimization calculation cycle composed of the heat transfer rate predicting means, the first stage metal temperature predicting means, the thermal stress predicting means, and the optimization calculating means, and the optimization calculating means outputs a manipulated variable at the current time in the manipulated variable optimum transition pattern to the rpm/load controlling unit as an optimum turbine acceleration rate/optimum load increase rate.

Further, the optimization calculating means included in the optimum starting controlling unit may be configured to simplify optimization calculation by assuming the turbine acceleration rate/load increase rate in the prediction period to be constant to reduce the number of variables for optimization calculation by the optimization calculating means.

Further, the optimum starting controlling unit may include heat transfer rate prediction model modifying means for adapting a heat transfer rate prediction model, which is based on the manipulated variable in the thermal stress predicting means, on the basis of a measured plant value for each control period.

Furthermore, optimum starting control correcting means may be further provided on an output side of the optimum starting controlling unit. The optimum starting control correcting means is set to receive an input of plant constraint conditions that are not taken into account by the optimum starting controlling unit under the constraint of power plant operating conditions, and correct the optimum manipulated variable calculated by the optimum starting controlling unit or a plant starting schedule.

Furthermore, in order to solve the above-mentioned problems, according to another aspect of the present invention, there is provided a turbine starting control method for adjusting and controlling an amount of steam or gas flowing into a turbine using a control valve, the method including: a thermal stress predicting step of predicting, with respect to an assumed manipulated variable, a thermal stress generated in a turbine rotor over a prediction period from a current time to a future; and an optimization calculation step of calculating for each predetermined control period a manipulated variable optimum transition pattern while keeping the predicted thermal stress equal to or lower than a prescribed value under a constraint of plant operating conditions. In the optimization calculation step, a value at the current time in the manipulated variable optimum transition pattern is determined as an actual optimum manipulated variable.

Further, in the above aspect, the turbine starting control method may further include a heat transfer rate predicting step of predicting a heat transfer rate in the prediction period on the basis of the manipulated variable in an optimization process from the optimization calculation step; and a first stage metal temperature predicting step of predicting a first stage metal temperature in the prediction period from the predicted heat transfer rate and a measured first stage metal temperature, and upon receiving the predicted rate of change of the first metal temperature from the first stage metal temperature predicting step, the thermal stress in the turbine rotor is predicted in the thermal stress predicting step, and the optimization calculation step of calculating the manipulated variable optimum transition pattern for each predetermined control period from the predicted thermal stress is repeated, thus forming an optimization calculation cycle.

Further, the optimization calculation may be simplified by assuming the manipulated variable in the prediction period to be constant to reduce the number of variables for the optimization calculation.

Further, the heat transfer rate predicting step may include a prediction model correcting step of adapting a heat transfer rate model, which is based on the manipulated variable, on the basis of measured plant values for each control period.

In a further aspect of the present invention, there is provided a turbine starting controller for adjusting and controlling an amount of steam or gas flowing into a turbine, including an optimum starting controlling unit having: a thermal stress predicting unit for calculating a predicted thermal stress value in a prediction period with respect to each of manipulated variables at a plurality of points assumed in advance; and an approximate optimization calculating unit for approximately calculating, from a maximum value of the thermal stress predicted by the thermal stress predicting unit, an optimum manipulated variable that makes a turbine starting time shortest while keeping the maximum value of the thermal stress equal to or lower than a prescribed value under a constraint of plant operating conditions, through straightforward deterministic operation.

In a still further aspect of the present invention, there is also provided a turbine starting control method for a turbine having a control valve for adjusting and controlling an amount of steam or gas flowing into the turbine, including: a thermal stress predicting step of calculating a predicted thermal stress value in a prediction period with respect to each of manipulated variables at a plurality of points assumed in advance; and an approximate optimization calculation step of approximately calculating, from a maximum value of the thermal stress, an optimum manipulated variable that makes a turbine starting time shortest while keeping the maximum value of the thermal stress equal to or lower than a prescribed value under a constraint of plant operating conditions, for each control period through straightforward deterministic operation. The approximate optimization calculation step includes outputting as an optimum turbine acceleration rate/load increase rate the optimum manipulated variable approximately calculated for each control period.

With the turbine starting controller and the starting control method for the turbine starting controller according to the present invention of the structures and characters mentioned above, the thermal stress generated in the turbine rotor is predicted while taking as a variable the turbine acceleration rate/load increase rate that is a manipulated variable, and the shortest turbine starting time can be realized while keeping the predicted thermal stress equal to or lower than the prescribed value, whereby the accuracy of the optimum starting control for the turbine can be enhanced, and a manipulated variable of high accuracy and reliability can be obtained.

Further, with the turbine starting controller and the starting control method for the turbine starting controller according to the present invention, by means of the optimization calculation assuming a constant turbine acceleration rate/load increase rate in the prediction period, the variables for the optimization calculation can be reduced to simplify the calculation, whereby the optimum manipulated variable can be quickly obtained with relatively little computational complexity.

Further, with the turbine starting controller and the starting control method for the turbine starting controller according to the present invention, the calculation for the predicted thermal stress is carried out with respect to the turbine acceleration rate/load increase rate at each of the plurality of preset points, and on the basis of the results of the calculation, the optimum turbine acceleration rate/load increase rate is obtained through inverse operation using linear interpolation, whereby the turbine acceleration rate/load increase rate as a highly accurate manipulated variable of a quasi-optimum solution can be obtained.

The nature and further characteristic features of the present invention will be made clear from the following descriptions made with reference to the accompanying drawings.

BRIEF DESCRIPTION OF THE DRAWINGS

In the accompanying drawings.

DESCRIPTION OF THE PREFERRED EMBODIMENTS

Embodiments of a turbine starting controller and a starting control method for the same according to the present invention will be described hereunder with reference to the accompanying drawings.

Figure 1:
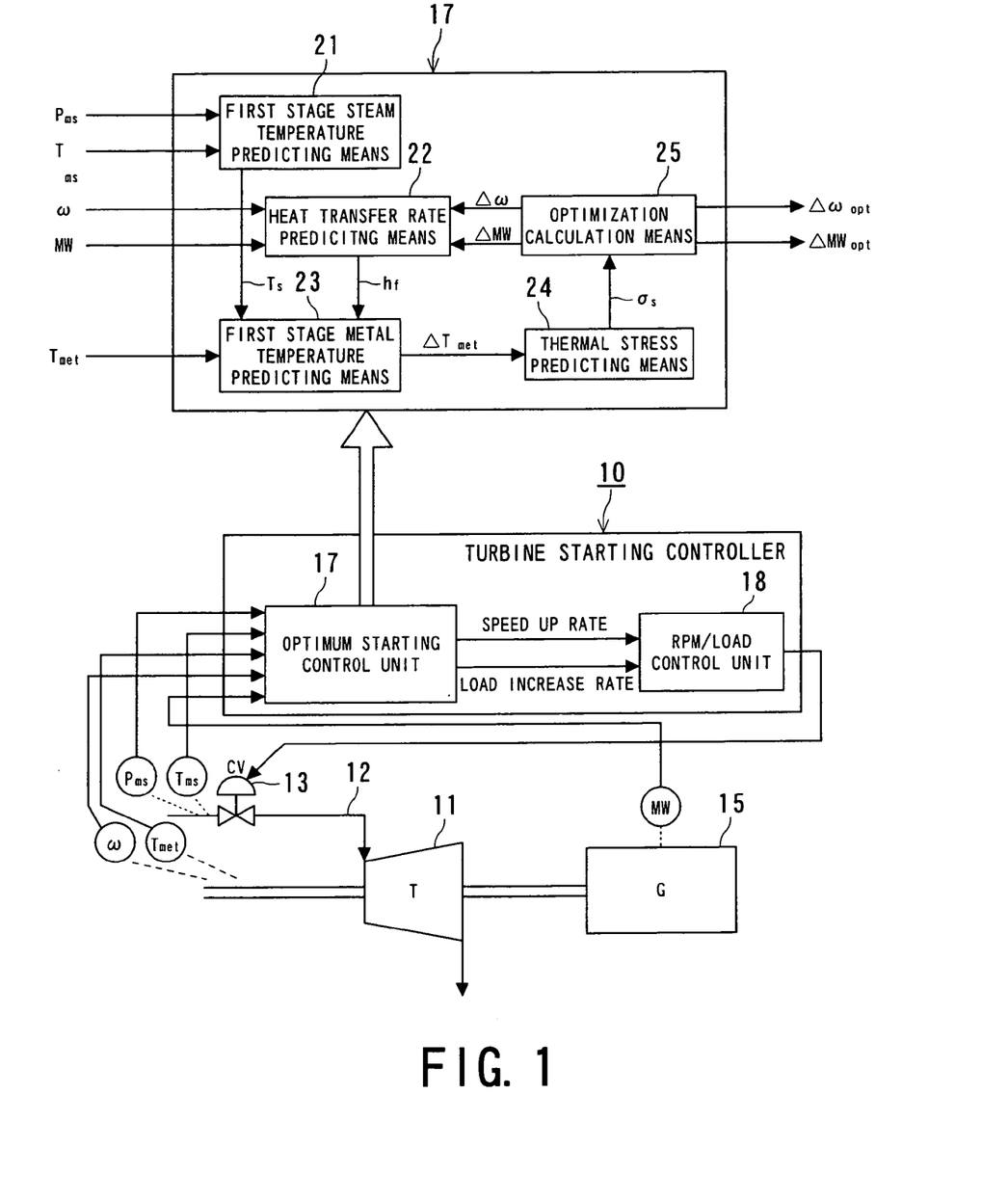
FIG. 1 is a diagram for the explanation of a turbine starting controller and a starting control method for the turbine starting controller according to a first embodiment of the present invention, illustrating the overall configuration of the turbine starting controller.

FIG. 1 is a schematic diagram showing the first embodiment of a turbine starting controller according to the present invention. A turbine starting controller 10 is a controller for achieving optimum starting of a steam turbine 11 or a gas turbine. Herein, the term "optimum starting" refers to such a starting control as to achieve the shortest turbine starting while keeping the thermal stress of a turbine rotor equal to or lower than a prescribed value.

Connected to a steam inlet of the steam turbine 11 is a main steam pipe 12 for guiding main steam from a steam generator such as a boiler, not shown. A flow rate adjusting valve 13 as a control value is provided at some midpoint of the main steam pipe 12. The flow rate adjusting valve 13 is subjected to a drive control by the turbine starting controller 10, thus effecting control so as to achieve optimum starting of the steam turbine 11.

Further, the steam turbine 11 is connected to a power generator 15. Required electric power is obtained by rotationally driving the power generator 15 through the driving of the steam turbine 11. The turbine starting controller 10 performs the control on the revolution (rpm) of the steam turbine 11 and on the load of the power generator 15.

The turbine starting controller 10 adjusts and controls the control value for adjusting the flow rate of main steam or the flow rate of gas flowing into the steam turbine 11 or the gas turbine, thereby controlling the rpm and load of the steam turbine 11 and the power generator 15, respectively.

The turbine starting controller 10 has optimum starting controlling means 17 for outputting an optimum turbine acceleration rate/load increase rate calculated from a plant state variable, and rpm/load controlling means 18 for performing rpm/load control by performing valve control on the control valve on the basis of the turbine acceleration rate/load rise rate.

The optimum starting controlling means 17 obtains, through calculation from plant state variables such as a main steam pressure $P_{ms}$, a main steam temperature $T_{ms}$, a turbine rpm ω, and a generator load MW, the optimum turbine acceleration rate/load increase rate for achieving the shortest starting time while keeping the thermal stress generated in the turbine rotor of the steam turbine 11, or the gas turbine, equal to or lower than a prescribed value. The optimum turbine acceleration/load increase rate, which is the optimum manipulated variable obtained through repetitive calculation is output to the rpm/load controlling means 18 serving as valve drive controlling means.

The rpm/load controlling means 18 is input with the optimum turbine acceleration rate/load increase rate signal so as to perform drive control on the flow rate adjusting valve 13 as the control valve, thereby performing the control on the turbine rpm and the generator load.

Herein, the turbine acceleration rate refers to the rate of change in the rotor rpm of the turbine rotor, and the load increase rate refers to the rate of change in the load of the generator.

Further, the optimum starting controlling means 17 equipped to the turbine starting controller 10 is composed of: first stage steam temperature predicting means 21 for predicting a first stage steam temperature $T_s(k+j)$ (j=1, 2, ..., m) in a predetermined future prediction period from the current plant state variables $P_{ms}$ and $T_{ms}$; heat transfer rate predicting means 22 for predicting a heat transfer rate hf(k+j) from the first stage steam temperature $T_s$ to a first stage metal temperature of the turbine rotor; first stage metal temperature predicting means 23 for predicting a first stage metal temperature $T_{met}(k+j)$ in the prediction period from the first stage steam temperature $T_s$, the heat transfer rate $h_f$, and the measured first stage metal temperature $T_{met}$; thermal stress predicting means 24 for predicting thermal stress σs(k+j) generated in the turbine rotor in the prediction period from a rate of change $\Delta T_{met}$ of the first stage metal temperature $T_{met}(k+j)$ calculated by the metal temperature predicting means 23; and optimization calculating means 25 for performing manipulated variable optimization calculation from the predicted thermal stress $\sigma_s(k+j)$ to obtain an optimization transition pattern, and outputting the value of the manipulated variables at the current time in this optimization transition pattern as an optimum turbine acceleration rate $\Delta\omega_{opt}$ and an optimum load increase rate $\Delta MW_{opt}$.

The first stage steam temperature predicting means 21 of the optimum starting controlling means 17 is input with the measured values of the main steam pressure $P_{ms}$ and of the main steam temperature $T_{ms}$ as the plant state variables for the power plant and is adapted to predict the first stage steam temperature $T_s(k+j)$ in the prediction period through calculation.

Further, the heat transfer rate predicting means 22 is input with the measured values of the turbine rpm ω of the steam turbine 11 and of the generator load MW and predicts the heat transfer rate $h_f$ from the first stage steam temperature $T_s$ to the first stage metal temperature $T_{met}$ of the turbine rotor based on a turbine acceleration rate pattern Δω and a load increase rate pattern ΔMW in the optimization process as assumed manipulated variables for the prediction period from the optimization calculating means 25.

The first stage metal temperature predicting means 23 is input with the first stage metal temperature $T_{met}$ as the measured value and predicts the first stage metal temperature $T_{met}(k+j)$ in the prediction period from the first stage steam temperature $T_s(k+j)$ predicted by the first stage steam temperature predicting means 21 and the heat transfer rate $h_f(k+j)$ predicted by the heat transfer rate predicting means 22, thereby calculating a predicted rate of change of the first stage metal temperature $\Delta T_{met}$.

Furthermore, the thermal stress predicting means 24 predicts the thermal stress $\sigma_s(k+j)$ in the prediction period generated in the turbine rotor. An optimization transition pattern is computed by the optimization calculating means 25 performing repeated optimization calculation for the turbine acceleration rate/load increase rate pattern as the manipulated variable based on the predicted thermal stress $\sigma_s(k+j)$ from the thermal stress predicting means 24. Based on the optimization transition pattern, the optimization calculating means 25 outputs, to the rpm/load controlling means 18, the values at the current time as the optimum turbine acceleration rate $\Delta\omega_{opt}$ and the optimum load increase rate $\Delta MW_{opt}$ representing the optimum manipulated variables.

The rpm/load controlling means 18 functions as valve controlling means for the flow rate adjusting valve 13 serving as the control valve. With the optimum turbine acceleration rate $\Delta\omega_{opt}$ and the optimum load increase rate $\Delta MW_{opt}$ as the optimum manipulated variables, the rpm/load controlling means 18 performs drive control on the flow rate adjusting valve 13, that is, valve opening adjusting control, on the basis of the optimum manipulated variables.

In the process of the optimization of the turbine acceleration rate/load increase rate as the manipulated variable, the optimization calculating means 25 feeds back the turbine acceleration rate pattern Δω and the load increase rate pattern ΔMW in the optimization process to the heat transfer rate predicting means 22. The heat transfer rate predicting means 22 predicts the heat transfer rate hf(k+j) in the prediction period, and the first stage metal surface predicting means 23 calculates the predicted rate of change of the first stage metal temperature $\Delta T_{met}(k+j)$. Further, the thermal stress predicting means 24 predicts the thermal stress $\sigma_s(k+j)$ in the prediction period from the predicted rate of change of the first stage metal temperature $\Delta T_{met}(k+j)$, and the optimization calculating means 25, to which the predicted thermal stress $\sigma_s(k+j)$ is input, repeatedly performs the optimization calculation for obtaining the turbine acceleration rate/load increase rate pattern as the manipulated variable. The optimization calculating means 25 optimizes the patterning of the turbine acceleration rate/load increase rate as the manipulated variable based on the above optimization calculation (control) cycle, thereby calculating the optimum transition pattern.

The optimization calculating means 25 outputs, to the rpm/load controlling means 18, the values at the current time in the optimum transition pattern as the optimized turbine acceleration rate (that is, the optimum turbine acceleration rate $\Delta\omega_{opt}$) and the optimized load increase rate (that is, the optimum load increase rate $\Delta MW_{opt}$). At this time, the cycle of output from the optimization calculating means 25 to the rpm/load controlling means 18 is set as one control period. As for the one control period in this case, the frequency of the output from the optimization calculating means 25 to the rpm/load controlling means 18 may be every plural optimization control cycles. Normally, one control period, for example, one minute, is an optimum value update period obtained through repetition of plural optimization calculation cycles.

Next, a specific calculation method executed by the optimum starting controlling means 17 in the turbine starting controller 10 will be described based on the example of optimizing the turbine acceleration rate prior to the incorporation of the generator.

(a) First Stage Steam Temperature Predicting Means 21

In the first stage steam temperature predicting means 21 of the optimum starting controlling means 17, the first stage steam temperature $T_s$ is estimated as a function of two variables, the main steam pressure $P_{ms}$ and the main steam temperature $T_{ms}$, as a function specific to the power plant, and is represented by the following expression (1):

[Numerical Expression 1]

$$Ts = f(P_{ms}, T_{ms}) \qquad (1)$$

Now, assuming that the first stage steam temperature at the current time is $T_s(k)$, and the first stage steam temperature at the previous point in time is $T_s(k-1)$, the rate of change of the first stage steam temperature $\Delta T_s$ is represented as follows:

[Numerical Expression 2]

$$\Delta Ts = Ts(k) - Ts(k-1) \qquad (2)$$

From the expression (2), it is possible to calculate the rate of change of the first stage steam temperature $\Delta T_s$ per one control period in the prediction period.

With the above calculation results taken as reference, when the predicted first stage steam temperature $T_s(k+j)$ (j=1, 2, ..., m) in each step over a predetermined prediction period m from the present to the future, the predicted first stage steam temperature $T_s(k+j)$ is represented by the expression (3) below.

[Numerical Expression 3] (3)

$$\begin{pmatrix} Ts(k+1) \\ Ts(k+2) \\ Ts(k+3) \\ \vdots \\ Ts(k+m) \end{pmatrix} = \begin{pmatrix} Ts(k) + \Delta Ts \\ Ts(k) + 2\Delta Ts \\ Ts(k) + 3\Delta Ts \\ \vdots \\ Ts(k) + m \cdot \Delta Ts \end{pmatrix}$$

From the expression (3), it is found that the predicted first stage steam temperature $T_s(k+j)$ is represented as a constant with respect to the turbine acceleration rate $\Delta\omega$ and the load increase rate $\Delta MW$ being the manipulated variables as optimization variables. That is, the first stage steam temperature predicting means 21 is placed outside of the optimization calculation cycle and is independent from the turbine acceleration rate $\Delta\omega$ and the load increase rate $\Delta MW$ as the manipulated variables, thus functioning as a constant.

(b) Heat Transfer Rate Predicting Means 22

The heat transfer rate hf from the first stage steam temperature $T_s$ to the first stage metal temperature $T_{met}$ is defined by the following heat transfer equation.

[Numerical Expression 4]

$$T_{met}(k) = T_{met}(k-1) + hf(k) \cdot \{Ts(k-1) - T_{met}(k-1)\} \qquad (4)$$

where $T_{met}(k)$: first stage metal temperature at current time (k)

$T_{met}(k-1)$: first stage metal temperature at previous point in time (k-1)

$T_s(k-1)$: first stage steam temperature at previous point in time (k-1)

hf(k): heat transfer rate at current time (k)

Incidentally, when a proportional model of the turbine rpm $\omega$ is assumed as an example of a heat transfer rate model, the heat transfer rate $h_f(k)$ at the current time can be represented as follows:

[Numerical Expression 5]

$$hf(k) = \alpha\omega(k) \qquad (5)$$

where $\omega(k)$: turbine rpm at current time $\alpha$: constant of proportionality With the expression (5) as reference, when the heat transfer rate hf(k+j) (where j=0, 1, 2, ..., m) in the prediction period is predicted with respect to the turbine rpm $\omega(k)$ at the current time and the turbine acceleration rate $\Delta\omega(k+j)$ (where j=0, 1, 2, ..., m−1) in the prediction period, hf(k+j) is represented by the following expression.

[Numerical Expression 6] (6)

$$\begin{pmatrix} hf(k+1) \\ hf(k+2) \\ hf(k+3) \\ \vdots \\ hf(k+m) \end{pmatrix} = \alpha \cdot \begin{pmatrix} \omega(k+1) \\ \omega(k+2) \\ \omega(k+3) \\ \vdots \\ \omega(k+m) \end{pmatrix} = \alpha \begin{pmatrix} \omega(k) + \Delta\omega(k) \\ \omega(k) + \sum_{j=0}^{1}\Delta\omega(k+j) \\ \omega(k) + \sum_{j=0}^{2}\Delta\omega(k+j) \\ \vdots \\ \omega(k) + \sum_{j=0}^{m-1}\Delta\omega(k+j) \end{pmatrix}$$

Since the turbine rpm $\omega$ tops out at a rated rpm $\omega_{RATE}$, the expression can be corrected as follows.

[Numerical Expression 7] (7)

$$\omega(k+j) = \min\left\{\omega(k) + \sum_{l=0}^{j-1}\Delta\omega(k+l), \omega_{RATE}\right\},$$

$$(j = 1, 2, 3 \ldots m)$$

(c) First Stage Metal Temperature Predicting Means 23

When the first stage metal temperature $T_{met}(k+j)$ is calculated using the heat transfer equation represented by the expression (4) based on the predicted first stage steam temperature $T_s(k+j)$ from the first stage steam temperature predicting means 21, the predicted heat transfer rate hf(k+j) from the heat transfer rate predicting means 22, and the first stage metal temperature $T_{met}(k)$ at the current time, the first stage metal temperature $T_{met}(k+j)$ can be predicted by the following expression.

[Numerical Expression 8] (8)

$$\begin{pmatrix} T_{met}(k+1) \\ T_{met}(k+2) \\ T_{met}(k+3) \\ \vdots \\ T_{met}(k+m) \end{pmatrix} =$$

$$\begin{pmatrix} T_{met}(k) + hf(k+1)\{Ts(k) - T_{met}(k)\} \\ T_{met}(k+1) + hf(k+2)\{Ts(k+1) - T_{met}(k+1)\} \\ T_{met}(k+2) + hf(k+3)\{Ts(k+2) - T_{met}(k+2)\} \\ \vdots \\ T_{met}(k+m-1) + hf(k+m)\{Ts(k+m-1) - T_{met}(k+m-1)\} \end{pmatrix}$$

From the expression (8), with a rate of change of the first stage metal temperature during one step (one control period) being $\Delta T_{met}(k+j)$, the rate of change of the first stage metal temperature during one step (one control period) $\Delta T_{met}(k+j)$ is represented by the following expression:

[Numerical Expression 9]

$$\Delta T_{met}(k+j) = T_{met}(k+j) - T_{met}(k+j-1), (j=1, 2, 3, \ldots m) \quad (9)$$

From the expression (9), the rate of change of the first stage metal temperature $\Delta T_{met}(k+j)$ per one step in the prediction period can be generally represented by the following expression (10).

[Numerical Expression 10] (10)

$$\begin{pmatrix} \Delta T_{met}(k+1) \\ \Delta T_{met}(k+2) \\ \Delta T_{met}(k+3) \\ \vdots \\ \Delta T_{met}(k+m) \end{pmatrix} = \begin{pmatrix} hf(k+1)\{Ts(k) - T_{met}(k)\} \\ hf(k+2)\{Ts(k+1) - T_{met}(k+1)\} \\ hf(k+3)\{Ts(k+2) - T_{met}(k+2)\} \\ \vdots \\ hf(k+m)\{Ts(k+m-1) - T_{met}(k+m-1)\} \end{pmatrix}$$

(d) Thermal Stress Predicting Means 24

The calculation expression for the rotor surface thermal stress generated in the turbine rotor at the current time k takes into account only the radial heat distribution, under the assumption that the turbine rotor is a cylinder of an infinite length (infinite cylinder). By using a model in which the turbine motor is radially split in, for example, ten, and one control period is further split in ten, the expression for determining the thermal stress in the turbine rotor is expressed by the following state-space model expressions.

[Numerical Expressions 11 and 12]

$$Xe(k) = Ae \cdot Xe(k-1) + Be \cdot \Delta T_{met}(k) \quad (11)$$

$$\sigma_s(k) = Ce \cdot Xe(k) \quad (12)$$

where
$A_e, B_e, C_e$: matrix coefficient of rotor material
$X_e(k)$: temperature distribution of element in radial direction of rotor at current time k
$\sigma_s(k)$: rotor surface thermal stress at current time k Here, $X_e(k)$, $\Delta T_{met}(k)$, and $A_e, B_e, C_e$ in the expressions (11) and (12) are represented as follows.

[Numerical Expression 13] (13)

$$\left. \begin{array}{l} Xe(k) = [T_1(k)\ T_2(k)\ T_3(k) \ldots T_{11}(k)\ T_{met}(k)]^T \\ \Delta T_{met}(k) = T_{met}(k) - T_{met}(k-1) \\ Ae = \begin{bmatrix} A & B \\ 0 & 1 \end{bmatrix}, Be = \begin{bmatrix} D \\ 1 \end{bmatrix}, Ce = (C0) \end{array} \right\}$$

Further, the respective constants and variables in the expression (13) are represented by the following expression.

[Numerical Expression 14] (14)

$$\left. \begin{array}{l} A = A_m^{10},\ B = A_m^9 B_m + A_m^8 B_m + \ldots + A_m B_m + B_m \\ D = 0.1 A_m^9 B_m + 0.2 A_m^8 B_m + \ldots + 0.9 A_m B_m + B_m \end{array} \right\}$$

$$A_m = \begin{pmatrix} 1-F & F & 0 & 0 & 0 & 0 & 0 & 0 & 0 & 0 \\ D(1) & E & C(1) & 0 & 0 & 0 & 0 & 0 & 0 & 0 \\ 0 & D(2) & E & C(2) & 0 & 0 & 0 & 0 & 0 & 0 \\ 0 & 0 & D(3) & E & C(3) & 0 & 0 & 0 & 0 & 0 \\ 0 & 0 & 0 & D(4) & E & C(4) & 0 & 0 & 0 & 0 \\ 0 & 0 & 0 & 0 & D(5) & E & C(5) & 0 & 0 & 0 \\ 0 & 0 & 0 & 0 & 0 & D(6) & E & C(6) & 0 & 0 \\ 0 & 0 & 0 & 0 & 0 & 0 & D(7) & E & C(7) & 0 \\ 0 & 0 & 0 & 0 & 0 & 0 & 0 & D(8) & E & C(8) & 0 \\ 0 & 0 & 0 & 0 & 0 & 0 & 0 & 0 & D(9) & E & C(9) \\ 0 & 0 & 0 & 0 & 0 & 0 & 0 & 0 & 0 & G & 1-G-H \end{pmatrix},$$

$$B_m = \begin{pmatrix} 0 \\ 0 \\ 0 \\ 0 \\ 0 \\ 0 \\ 0 \\ 0 \\ 0 \\ 0 \\ H \end{pmatrix},$$

-continued $$C = E_K \left( 0 \quad \frac{2\Delta R^2}{R_0^2} \quad \frac{4\Delta R^2}{R_0^2} \quad \frac{6\Delta R^2}{R_0^2} \quad \frac{8\Delta R^2}{R_0^2} \quad \frac{10\Delta R^2}{R_0^2} \quad \frac{12\Delta R^2}{R_0^2} \quad \frac{14\Delta R^2}{R_0^2} \quad \frac{16\Delta R^2}{R_0^2} \quad \frac{18\Delta R^2}{R_0^2} \quad \frac{10\Delta R^2}{R_0^2} - 1 \right)$$

The respective constants and variables in the expressions (13) and (14) are as follows.

$\Delta T_{met}(k)$: first stage metal temperature at sampling time k $T_j(k)$: internal temperature of the j-th split rotor at sampling time t $\sigma_s(k)$: rotor surface thermal stress at sampling time k C(j), D(j): rotor mesh coefficient E. F. G, H, $E_K$: rotor material/outer shape/heat transfer coefficient $R_o$: rotor outer diameter $\Delta R$: rotor outer diameter/number of splits (10)

From the thermal stress calculation expressions as represented by the expressions (11) and (12), a thermal stress prediction model for predicting the thermal stress over a period from the current time k to a future time up to M steps advanced from the current time k is represented by the following state-space model expression.

[Numerical Expressions 15 and 16] (15)

$$\begin{pmatrix} \sigma_S(k+1) \\ \sigma_S(k+2) \\ \sigma_S(k+3) \\ \vdots \\ \sigma_S(k+m) \end{pmatrix} =$$

$$\begin{pmatrix} C_e A_e \\ C_e A_e^2 \\ C_e A_e^3 \\ \vdots \\ C_e A_e^m \end{pmatrix} X_e(k) + \begin{pmatrix} C_e B_e & 0 & 0 & \cdots & 0 \\ C_e A_e B_e & C_e B_e & 0 & \cdots & 0 \\ C_e A_e^2 B_e & C_e A_e B_e & C_e B_e & \cdots & 0 \\ \vdots & \vdots & \vdots & \ddots & \vdots \\ C_e A_e^{m-1} B_e & C_e A_e^{m-2} B_e & C_e A_e^{m-3} B_e & \cdots & C_e B_e \end{pmatrix} \begin{pmatrix} \Delta T_{met}(k+1) \\ \Delta T_{met}(k+2) \\ \Delta T_{met}(k+3) \\ \vdots \\ \Delta T_{met}(k+m) \end{pmatrix}$$

Here, (16)

$$A_p = \begin{pmatrix} C_e A_e \\ C_e A_e^2 \\ C_e A_e^3 \\ \vdots \\ C_e A_e^m \end{pmatrix},$$

$$B_p = \begin{pmatrix} C_e B_e & 0 & 0 & \cdots & 0 \\ C_e A_e B_e & C_e B_e & 0 & \cdots & 0 \\ C_e A_e^2 B_e & C_e A_e B_e & C_e B_e & \cdots & 0 \\ \vdots & \vdots & \vdots & \ddots & \vdots \\ C_e A_e^{m-1} B_e & C_e A_e^{m-2} B_e & C_e A_e^{m-3} B_e & \cdots & C_e B_e \end{pmatrix},$$

$[\Delta T_{met}] = \{\Delta T_{met}(k+1) \, \Delta T_{met}(k+2) \, \Delta T_{met}(k+3) \cdots \Delta T_{met}(k+m)\}^T$ The expression (15) represents a thermal stress prediction model with the first stage metal temperature change prediction vector $[\Delta T_{met}]$ taken as input.

From the predicted rate of change of the first stage metal temperature $\Delta T_{met}(k+j)$ (j=1, 2, . . . , m) in the prediction period as obtained by the first stage metal temperature predicting means 23, the predicted thermal stress $\sigma_s(k+j)$ (j=1, 2, . . . , m) in the prediction period can be calculated using the expression (15).

(e) Optimization Calculation Means 25

From the expression (6) representing the heat transfer rate $h_j(k+j)$ (j=1, 2, . . . , m) in the prediction period used in the heat transfer rate predicting means 22, the expression (10) representing the rate of change of the first stage metal temperature $\Delta T_{met}(k+j)$ in the prediction period used in the first stage metal temperature predicting means 23, and the expression (15) representing the thermal stress prediction model in the prediction period used in the thermal stress predicting means 24, it is appreciated that the predicted thermal stress $\sigma_s(k+j)$ is represented as a nonlinear function of the turbine acceleration rate pattern $\Delta_\omega(k+j)$ (j=0, 1, 2, . . . , m−1).

The optimization problem of determining the turbine acceleration rate pattern for realizing the shortest starting time while keeping the thermal stress generated in the turbine rotor during the startup of the power plant equal to or lower than a prescribed value is formularized as follows by the optimization calculating means 25.

Constraint condition: Satisfy the following expression with respect to a given prescribed thermal stress value $\sigma_{max}$.

[Numerical Expression 17] (17)

$$\begin{pmatrix} \sigma_S(k+1) \\ \sigma_S(k+2) \\ \sigma_S(k+3) \\ \vdots \\ \sigma_S(k+-m) \end{pmatrix} \leq \begin{pmatrix} \sigma_{max} \\ \sigma_{max} \\ \sigma_{max} \\ \vdots \\ \sigma_{max} \end{pmatrix}$$

Further, upper and lower limit values are set for the manipulated variables as required.

[Numerical Expression 18] (18)

$$\begin{pmatrix} \Delta\omega_{min} \\ \Delta\omega_{min} \\ \Delta\omega_{min} \\ \vdots \\ \Delta\omega_{min} \end{pmatrix} \leq \begin{pmatrix} \Delta\omega(k) \\ \Delta\omega(k+1) \\ \Delta\omega(k+2) \\ \vdots \\ \Delta\omega(k+m) \end{pmatrix} \leq \begin{pmatrix} \Delta\omega_{max} \\ \Delta\omega_{max} \\ \Delta\omega_{max} \\ \vdots \\ \Delta\omega_{max} \end{pmatrix}$$

where $\Delta\omega_{min}$: manipulated variable lower limit value $\Delta\omega_{max}$: manipulated variable upper limit value Here, the manipulated variable lower limit value $\Delta\omega_{min}$ is switched over as follows, for example, depending on whether or not the turbine rotor rpm falls within the critical rpm region.

(1) When in the critical rpm region, the manipulated variable lower limit value $\Delta\omega_{min}$ is as follows:

[Numerical Expression 19]

$$\Delta\omega_{min}=120[\text{rpm}] \quad (19)$$

(2) When outside the critical rpm region, the manipulated variable lower limit value $\Delta\omega_{min}$ is as follows:

[Numerical Expression 20]

$$\Delta\omega_{min}=0(\text{rpm})(\text{HOLD}) \quad (20)$$

Thus, in the critical rpm region, the turbine acceleration rate is not put on HOLD and can be set to a value equal to or higher than the value $\Delta\omega_{min}$ without fail. When the rated rpm of the steam turbine is 3600 rpm, for example, the critical rpm region falls within a region of 900 rpm to 3300 rpm.

In the optimization calculating means 25, in order to achieve optimization of the turbine acceleration rate pattern $\Delta_{1o7}(k+j)$ (j=0, 1, 2, ..., m−1) in the prediction period,

[Numerical Expression 21]

The optimization of the objective function: maximization of $$\sum_{j=0}^{m-1} \Delta\omega(k+j) \quad (21)$$

is carried out.

The optimization represents an m-variables non-linear optimization problem, which can be solved by the technique of line search such as the quasi-Newton method.

Finally, the leading optimum manipulated variable $\Delta_\omega(k)$ is determined as an optimum turbine acceleration rate at the current time k, and the optimum turbine acceleration rate signal $\Delta_{\omega opt}$ is output to the rpm/load controlling means 18.

The optimization calculating means 25 can formularize and calculate the optimization of the turbine acceleration rate pattern (and the generator load increase rate pattern) in the prediction period. In this formularization, it is possible to add the binding condition as represented by the following expression that the turbine acceleration rate in each step in the prediction period be constant at all times with respect to a design variable $\Delta_\omega(k+j)$ (j=0, 1, 2, ..., m−1).

[Numerical Expression 22]

$$\Delta\omega(k)=\Delta\omega(k+1)=\Delta\omega(k+2)=\ldots=\Delta\omega(k+m-1) \quad (22)$$

According to the expression (22), the optimization problem of the turbine acceleration rate pattern (and the generator load increase rate pattern) in the prediction period can be significantly simplified from that of m-variables optimization to that of one-variable optimization, which proves advantageous in mounting the turbine starting controller 10 for actual use.

From the simulation results on turbine starting, it was found that multivariable optimization calculation is unnecessary because almost all of the optimization calculation results with multiple variables led to the conclusion that all the manipulated variables are equal in the prediction period.

With the turbine starting controller as described above, since the optimization calculation can be carried out through one-variable optimization, the computational complexity is relatively small, and the optimization calculation is significantly simplified, which proves advantageous in applying the turbine starting controller to actual use.

Next, the operation of the turbine starting controller will be described.

The turbine starting controller 10 is activated to start the power plant. The starting of the power plant is carried out by the optimum starting controlling means 17.

Upon the start-up of the optimum starting controlling means 17, the first stage steam temperature predicting means 21 is driven. The first stage steam temperature predicting means 21 is input with the measured values of the main steam pressure $P_{ms}$ and of the main steam temperature $T_{ms}$ at the current time k, predicts the first stage steam temperature $T_s(k+j)$ (j=1, 2, ..., m) over the prediction period from the present to the future, and outputs the predicted first stage steam temperature $T_s(k+j)$ to the first stage metal temperature predicting means 23.

On the other hand, the heat transfer rate predicting means 22 appropriately sets the initial value of the turbine acceleration rate/load increase rate pattern in the prediction period, which is the assumed manipulated variable, predicts the heat transfer rate $h_f(k+j)$ in the prediction period from the measured value of the current turbine rpm $\omega(k)$/generator load MW(k), and outputs the predicted heat transfer rate $h_f(k+j)$ to the first stage metal temperature predicting means 23.

Next, the first stage metal temperature predicting means 23 is input with the measured value of the first stage metal temperature $T_{met}$ of the steam turbine 11, and from the predicted first stage steam temperature $T_s(k+j)$ and the predicted heat transfer rate $h_f(k+j)$, calculates the first stage metal temperature $T_{met}(k+j)$ in the prediction period.

The predicted first stage metal temperature $T_{met}(k+j)$ calculated by the first stage metal temperature predicting means 23 and the rate of change thereof $\Delta T_{met}$ are input to the thermal stress predicting means 24, and the predicted thermal stress $\sigma_s(k+j)$ in the prediction period is calculated by the thermal stress predicting means 24.

[Table 1]

The optimization calculating means 25 carries out the optimization calculation based on the predicted thermal stress $\sigma s(k+j)$ input from the thermal stress predicting means 24. In the optimization calculation, a search is made for the optimum manipulated variable so that $$\sum_{j=0}^{m} \Delta\omega(k+j)$$

of each element of the turbine acceleration rate pattern/load increase rate pattern as the manipulated variable becomes maximum under the constraint condition that the maximum value of the predicted thermal stress $\sigma_s(k+j)$ be not higher than the prescribed value $\sigma_{smax}$, and the thermal stress predicting calculation is repeated over and over.

The optimization calculating means 25 feeds back the turbine acceleration rate pattern $\Delta\omega$ and the load increase rate pattern $\Delta$MW in the optimization process to the heat transfer rate predicting means 22, circulates them within the optimization circulation cycle composed of the first stage metal temperature predicting means 23 and the thermal stress predicting means 24, iterated by repeating the thermal stress predicting calculation, and converged to the optimum solution.

Then, after the convergence to the optimum solution, the manipulated variable at the current time k is output to the rpm/load controlling means 18 as the optimum turbine acceleration rate/load increase rate.

The rpm/load controlling means 18 functions as valve drive controlling means for performing drive control on the flow rate adjusting valve 13 serving as the control valve and controls the valve opening of the flow rate adjusting valve 13 based on the optimum turbine acceleration rate/load increase rate signal.

By the optimization calculating means 25, the optimum starting controlling means 17 repeats the thermal stress predicting calculation for retrieving the optimum manipulated variable which makes the objective function for the turbine acceleration rate/load increase rate pattern as the manipulated variable maximum under a constraint condition that the maximum value of the predicted thermal stress $\sigma_s(k+j)$ is not higher than the prescribed value $\sigma_{max}$. The series of repetitive calculations are sequentially executed for each one control period.

Further, under the assumption that the turbine acceleration rate/load increase rate pattern as the manipulated variable in the prediction period is constant, the same above-described method can be carried out for each one control period while simplifying the optimization calculation from multivariable calculation to one-variable calculation.

With the turbine starting controller 10 as described above, the steam turbine can be started in a stable and smooth manner in the shortest turbine starting time while keeping the thermal stress generated in the turbine rotor equal to or lower than a prescribed value.

Figure 2:
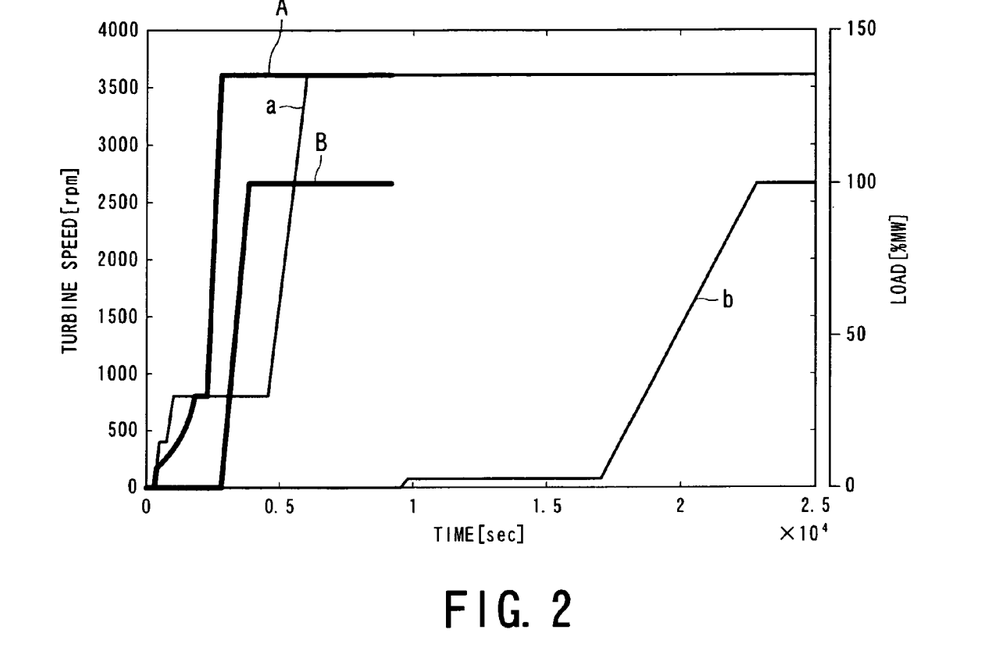
FIG. 2 is chart showing turbine starting control according to the turbine starting controller shown in FIG. 1, as compared to turbine starting control characteristics according to a conventional turbine starting controller.
Figure 3:
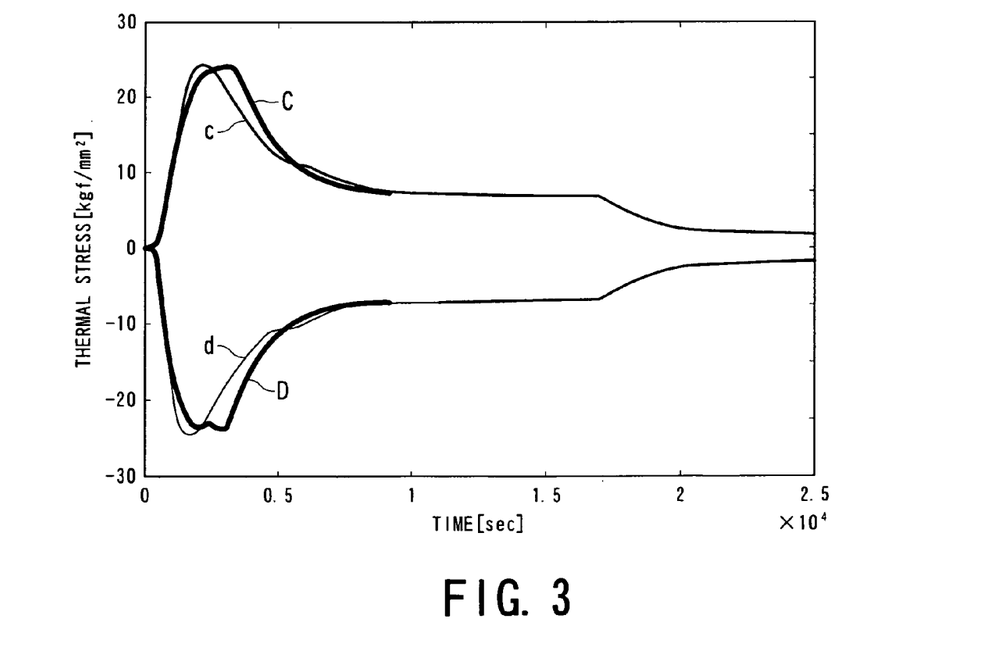
FIG. 3 is a chart corresponding to FIG. 2, showing characteristics of thermal stress generated in a turbine rotor as compared to the prior art characteristics.

FIGS. 2 and 3 show the starting characteristics of thermal stress prediction starting when, using the turbine starting controller 10, the turbine acceleration rate/load increase rate (as the manipulated variable) in the prediction period is assumed to be constant, and the optimization calculation is simplified to one-variable calculation.

In FIG. 2, symbol "A" denotes the starting characteristic of turbine rpm under the thermal stress prediction starting control by the turbine starting controller 10, and symbol "B" denotes the starting characteristic of generator load under the thermal stress prediction starting control by the turbine starting controller 10. The both indicate that the starting time is significantly shortened in comparison to a starting characteristic curve "a" of turbine rpm for conventional turbine starting controllers and a steam turbine generator as represented by a generator load starting characteristic curve "b", which means that the starting characteristic of the steam turbine generator is significantly improved.

Further, as is appreciated from FIG. 3, even when the starting control of the steam turbine is performed by the turbine starting controller 10, thermal stress change curves C and D on the bore and rotor surface sides of the turbine rotor, respectively, are little changed as compared with thermal stress change curves "c" and "d" on the bore and surface sides of the turbine rotor, respectively, of a conventional turbine starting controller with regard to the maximum value of the thermal stress. At this time, the prescribed value of the rotor surface thermal stress is set to, for example, −24.72 kg/mm².

The turbine starting control by the turbine starting controller 10 is performed as described below.

By activating the optimum starting controlling means 17 of the turbine starting controller 10, the optimum starting controlling means 17 repeats the optimization calculation cycle in which a heat transfer predicting step, a first stage metal temperature predicting step, a thermal stress predicting step, and an optimization calculation step are repeated.

In the heat transfer rate predicting step, with respect to the assumed manipulated variable or the turbine acceleration rate $\Delta\omega$/load increase rate $\Delta MW$ as the manipulated variable in the optimization process, the heat transfer rate $hf(k+j)$ over the prediction period from the current time to the future is predicted from the measured plant state variables (turbine rpm $\omega$ and generator load MW).

In the first stage metal temperature predicting step, the predicted heat transfer rate $hf(k+j)$ from the heat transfer rate predicting means 22, the predicted first stage steam temperature $T_s(k+j)$ from the first stage steam temperature predicting means 21, and the measured value $T_{met}$ of the first stage metal temperature are input to thereby predict the first stage metal temperature $T_{met}(k+j)$ in the prediction period, and the rate of change $\Delta T_{met}(k+j)$ thereof per one step is output to the thermal stress predicting step. In the thermal stress predicting step, the thermal stress $\sigma_s(k+j)$ generated in the turbine rotor in the prediction period is predicted.

Further, in the optimization calculation step, the manipulated variable optimum transition pattern is calculated for each predetermined control period while keeping the thermal stress from the thermal stress predicting means 24 equal to or lower than a prescribed value under the constraint of the plant operating conditions. In the optimization calculation step, the value at the current time in the manipulated variable optimum transition pattern is determined as the actual optimum manipulated variable, and the value of the manipulated variable at the current time (k) in the manipulated variable optimum transition pattern is output from the optimization calculating means 25 to the rpm/load controlling means 18 in the form of a signal indicative of the optimum turbine acceleration rate $\Delta\omega_{opt}$/load increase rate $\Delta MW_{opt}$ as the optimum manipulated variable. The rpm/load controlling means 18 is input with the signal of the optimum manipulated variable to adjust and control the flow rate adjusting valve 13 as the control valve.

Figure 4:
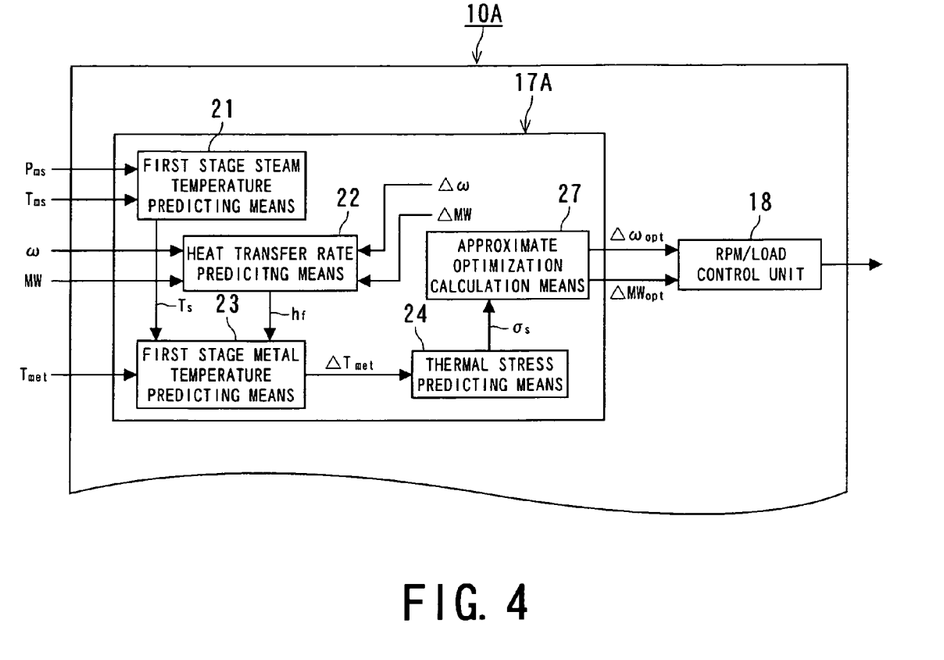
FIG. 4 is a block diagram for the explanation of a turbine starting controller and a starting control method for the turbine starting controller according to a second embodiment of the present invention, illustrating the configuration of optimum starting controlling means provided to the turbine starting controller.
Figure 5:
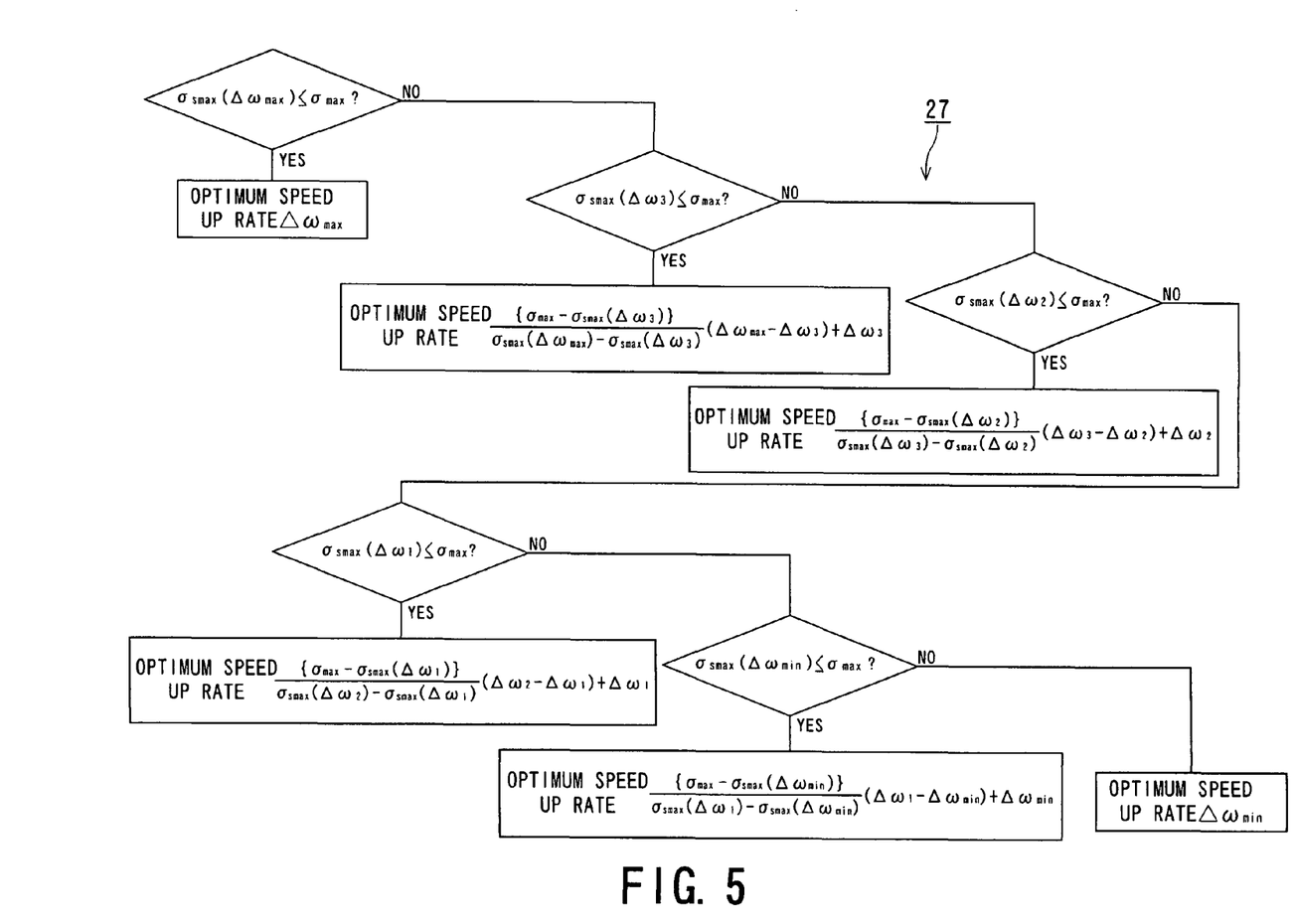
FIG. 5 is a flowchart of approximate optimization calculating means constituting the optimum starting controlling means shown in FIG. 4.

FIGS. 4 and 5 show a turbine starting controller and a starting control method for the turbine starting controller according to a second embodiment of the present invention.

In a turbine starting controller 10A according to the second embodiment, the optimization calculating means 25 included in the optimum starting controlling means 17 of the turbine starting controller 10 according to the first embodiment is replaced by approximate optimization calculating means 27. Otherwise, the turbine starting controller 10A is of substantially the same construction and operation as the turbine starting controller 10 according to the first embodiment, so that the same or like components are denoted by the same symbols and description thereof will be omitted.

In the turbine starting controller 10A shown in FIG. 4, the approximate optimization calculating means 27 is included in optimum starting controlling means 17A, which outputs the optimum manipulated variables $\Delta\omega_{opt}$ and $\Delta MW_{opt}$ to the rpm/load controlling means 18, so as to replace the optimization calculating means 25. In order to compute the optimum manipulated variable, the optimum starting controlling means 17A computes the optimum manipulated variables $\Delta\omega_{opt}$ and $\Delta MW_{opt}$ through straightforward operation without repeating an indefinite number of optimization calculation cycles, that is, without forming a repetitive calculation loop, and outputs them to the rpm/load controlling means 18 at a predetermined timing (control period).

In the optimum starting controlling means 17A, with respect to the turbine acceleration rate $\Delta\omega$ and the load increase rate $\Delta MW$ as the manipulated variables at several preset points, the maximum value $\sigma_{smax}$ of the predicted thermal stress $\sigma_s(k+j)$ in the prediction period is calculated by the thermal stress predicting means 24 via the heat transfer rate predicting means 22 and the first stage metal temperature predicting means 23.

From the maximum value $\sigma_{smax}$ of the predicted thermal stress $\sigma_s$ calculated by the thermal stress predicting means 24, the approximate optimization calculating means 27 approximately computes, using the technique of linear interpolation or the like, the maximum value of the manipulated variable satisfying the condition that the maximum value $\sigma_{smax}$ of the predicted thermal stress $\sigma_s(k+j)$ be equal to or lower than the prescribed value. The approximate optimization calculating means 27 outputs the maximum value of the manipulated variable thus computed to the rpm/load controlling means 18 as the optimum manipulated variable (optimum turbine acceleration rate $\Delta\omega_{opt}$/the optimum load increase rate $\Delta MW_{opt}$).

An example of the optimum manipulated variable computing procedure in the optimum starting controlling means 17A will be described.

In the optimum starting controlling means 17A, first, manipulated variables at a plurality of, for example, five points are set such that preset turbine acceleration rates $\Delta\omega$ at the five points consist of the following:

[Numerical Example 23]

$$\Delta\omega_{min} < \Delta\omega_1 < \Delta\omega_2 < \Delta\omega_3 < \Delta\omega_{max} \quad (23)$$

For each turbine acceleration rate $\Delta\omega$, the thermal stress $\sigma_s(k+j)$ in the prediction period is predicted by the thermal stress predicting means 24 via the heat transfer rate predicting means 22 and the first stage metal temperature predicting means 23.

When the maximum value $\sigma_{smax}$ of the thermal stress $\sigma_s(k+j)$ in the prediction period calculated with respect to each turbine acceleration rate $\Delta\omega$ is as follows:

$$\sigma_{smax}(\Delta\omega_{win}), \sigma_{smax}(\Delta\omega_1), \sigma_{smax}(\Delta\omega_2), \sigma_{smax}(\Delta\omega_3), \sigma_{smax}(\Delta\omega_{max}),$$

from the maximum value $\sigma_{smax}$ of the predicted thermal stress $\sigma_s(k+j)$, the optimum manipulated variable $\Delta\omega_{opt}/\Delta MW_{opt}$ can be approximately computed by the approximate optimization calculating means 27.

FIG. 5 shows an example of a flowchart of the approximate optimization calculating means 27 for approximately calculating the optimum manipulated variable $\Delta\omega_{opt}/\Delta MW_{opt}$.

In the approximate optimization calculating means 27, from the maximum value $\sigma_{smax}$ of the predicted thermal stress $\sigma_s(k+j)$ in the prediction period, the optimum manipulated variable $\Delta\omega_{opt}/\Delta MW_{opt}$ as an output value to the rpm/load controlling means 18 (see FIG. 1) can be computed through straightforward operation without repeating an indefinite number of optimization calculation cycles in the manipulated variable optimization process.

In the flowchart shown in FIG. 5, with respect to each turbine acceleration rate $\Delta\omega$ as the manipulated variable at each of several preset points, the maximum value $\sigma_{smax}$ of the predicted thermal stress $\sigma_s(k+j)$ is calculated by the thermal stress predicting means 24 via the heat transfer rate predicting means 22 and the first stage metal temperature predicting means 23.

Based on the maximum value $\sigma_{smax}$ ($\Delta\omega_{max}, \Delta\omega_3, \Delta\omega_2, \Delta\omega_1, \Delta\omega_{win}$) of the predicted thermal stress at each set point, the approximate optimization calculating means 27 computes, for each control period and through linear interpolation, the approximate optimum manipulated variable $\Delta\omega_{opt}/\Delta MW_{opt}$ which realizes the shortest starting time while satisfying the condition that the maximum value of the predicted thermal stress $\sigma_s(k+j)$ be equal to or lower than the prescribed value $\sigma_{smax}$, and outputs it to the rpm/load controlling means 18 (see FIG. 1).

In the turbine starting controller 10A, in the process of optimizing the turbine starting, the optimum manipulated variable (the optimum turbine acceleration rate, the optimum load increase rate) can be calculated without repeating an indefinite number of optimization calculation cycles, and the manipulated variable optimization can be realized through straightforward operation.

The turbine starting control in the turbine starting controller 10A can be performed by replacing the optimization calculation step in the turbine starting controller 10 according to the first embodiment with the approximate optimization calculation step.

In the approximate optimization calculation step, from the maximum value of the predicted thermal stress $\sigma_s(k+j)$ predicted in the thermal stress predicting step of the thermal stress predicting means 24, the optimum manipulated variable realizing the shortest starting time, while keeping the maximum value of the predicted thermal stress $\sigma_s(k+j)$ equal to or lower than the prescribed value under the constraint of the plant operating conditions, is approximately calculated through deterministic operation for each control period, and the approximate optimum manipulated variable thus obtained is output to the rpm/load controlling means 18 as the optimum turbine acceleration rate $\Delta\omega_{opt}$/load increase rate $\Delta MW_{opt}$. The rpm/load controlling means 18 performs drive control on the control valve 13 based on the approximate manipulated variable as the approximate optimum solution, thereby adjusting and controlling the valve opening to perform turbine starting control.

Further, in the turbine starting control by the turbine starting controller 10A, the manipulated variable (turbine acceleration rate $\Delta\omega$, load increase rate $\Delta MW$) in the optimization process is not output from the approximate optimization calculating means 27 to the heat transfer rate predicting means 22. The preset turbine acceleration rate $\Delta\omega$, load increase rate $\Delta MW$ as the assumed manipulated variable is input to the heat transfer rate predicting means 22.

Figure 6:
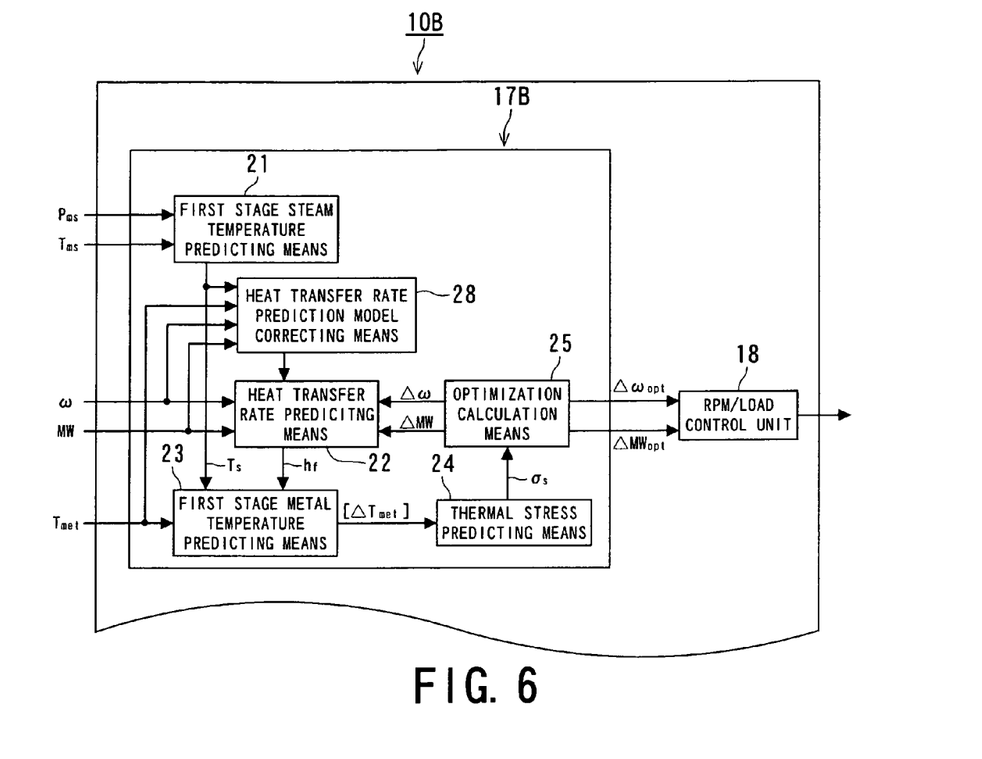
FIG. 6 is a block diagram for the explanation of a turbine starting controller and a starting control method for the turbine starting controller according to a third embodiment of the present invention, illustrating the configuration of optimum starting controlling means provided to the turbine starting controller.

FIG. 6 shows a turbine starting controller and a starting control method thereof according to a third embodiment of the present invention.

In a turbine starting controller 10B according to the third embodiment, heat transfer rate prediction model modifying means 28 is additionally provided to the optimum starting controlling means 17 of the turbine starting controller 10 according to the first embodiment. Otherwise, the turbine starting controller 10B is of substantially the same construction and operation as the turbine starting controller 10 according to the first embodiment, so that the same or like components are denoted by the same symbols and description thereof will be omitted.

In the turbine starting controller 10B shown in FIG. 6, the heat transfer rate prediction mode modifying means 28 is added to the optimum starting controlling means 17 according to the first embodiment to thereby obtain new optimum starting controlling means 17B.

In the optimum starting controlling means 17B, the prediction model of the heat transfer rate hf used in the heat transfer rate predicting means 22 which takes the manipulated variable as a variable is modified at real time. The heat transfer rate prediction model modifying means 28 modifies at real time the prediction model with the manipulated variable used in the heat transfer rate predicting means 22, based on the measured values of plant state variables such as the first state metal temperature $T_{met}$ for each control period.

A specific example of the model modifying procedure in the heat transfer rate model modifying means 28 will be described using the proportional model of the turbine rpm ω represented by the expression (5).

With respect to the first stage steam temperature $T_s(k-1)$ and the first stage metal temperature $T_{met}(k-1)$ at the previous point in time (k−1) and the measured first stage metal temperature value $T_{met}(k)$ at the current time k, the heat transfer rate hf(k) at the current time k is calculated through inverse operation on the actual value basis as in the following expression.

[Numerical Expression 24]

$$hf(k) = \frac{\Delta T_{met}(k)}{T_s(k-1) - T_{met}(k-1)} \quad (24)$$

From the above expression, a heat transfer prediction model coefficient α can be represented by the following expression.

[Numerical Expression 25]

$$\alpha = hf(k)/\omega(k) \quad (25)$$

where hf(k): heat transfer rate at current time k
ω(k): turbine rpm at current time k Since the actual proportional model of the turbine rpm varies according to the turbine rpm, the heat transfer rate hf(k) at the current time k is computed with accuracy through inverse operation from the actual basis for each control period. The accuracy of the heat transfer rate prediction model is maintained by using the highly accurate value of the model coefficient α.

It should be noted, however, that when the steam temperature has been sufficiently thermally transmitted to the turbine rotor side, and the absolute value of the mismatch temperature becomes small, the denominator on the right side of the expression (24) gets closer and closer to zero, thus approaching division by zero, leading to a deterioration in accuracy. Accordingly, when the absolute value of the mismatch temperature becomes equal to a prescribed value or less, the calculation of the heat transfer rate hf(k) at the current time k is interrupted, and the heat transfer rate prediction model coefficient α is set to retain the value at the previous point in time (k−1).

When the absolute value of the mismatch temperature becomes small, the value of the heat transfer rate hf(k) no longer exerts any influence on the change $\Delta T_{met}$ of the first stage metal temperature $T_{met}$ and thus does not contribute to the accuracy of thermal stress prediction.

In the turbine starting controller 10B, the heat transfer rate model modifying means 28 is added to the optimum starting controlling means 17B, and the coefficient α of the heat transfer rate prediction model is corrected for each control period on the actual value basis of plant state variables ($P_{ms}$, $T_{ms}$, ω, MW, and $T_{met}$) by the heat transfer rate model modifying means 28, whereby the accuracy of the heat transfer rate prediction model can be maintained.

In this way, according to the turbine starting controller 10B, the optimum starting controlling means 17B is provided with the heat transfer rate model modifying means 28, and the accuracy of the heat transfer rate prediction model used for the thermal stress prediction can be updated in real time by the heat transfer rate model modifying means 28 based on the measured values of the plant state variables, whereby the accuracy of thermal stress prediction can be improved.

As a result, with the optimization calculating means 25 of the optimum starting controlling means 17B, the shortest turbine starting time can be achieved while keeping the maximum value $\sigma_{smax}$ of the thermal stress $\sigma_s$ in the prediction period from the thermal stress predicting means 24 equal to or lower than the prescribed value $\sigma_{max}$, whereby an improvement can be achieved in terms of the accuracy of the optimum turbine starting control.

Figure 7:
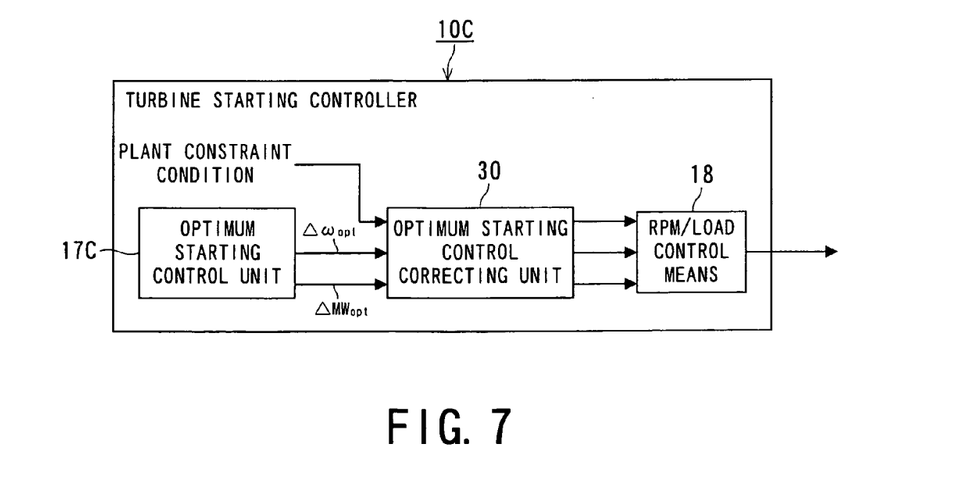
FIG. 7 is a block diagram for the explanation of a turbine starting controller and a starting control method for the turbine starting controller according to a fourth embodiment of the present invention, illustrating the configuration of the turbine starting controller.
Figure 8:
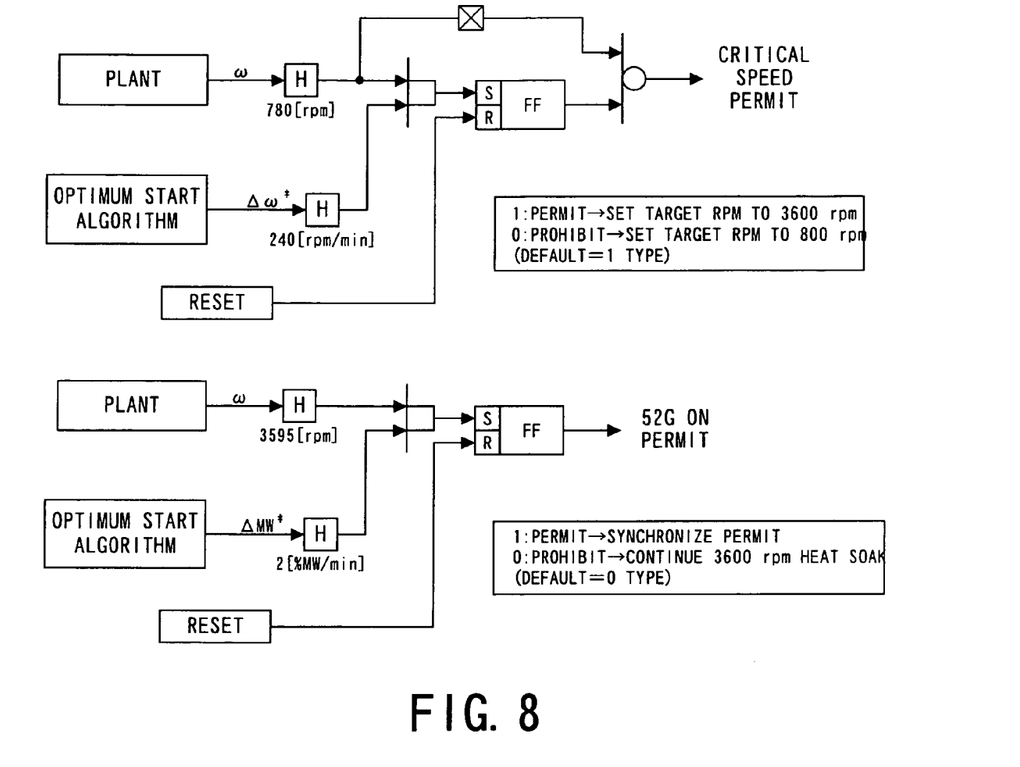
FIG. 8 is a diagram showing a specific example of logic used in optimum starting control correcting means shown in FIG. 7.

FIGS. 7 and 8 show a turbine starting controller and a starting control method thereof according to a fourth embodiment of the present invention.

A turbine starting controller 10C according to the fourth embodiment has optimum starting control correcting means 30 provided between the optimum starting controlling means 17 and the rpm/load controlling means 18 that are provided to the turbine starting controller 10 according to the first embodiment. In this case, the optimum starting controlling means 17 used may be either one of the optimum starting controlling means 17A shown in FIG. 4 and the optimum starting controlling means 17B shown in FIG. 6. In the turbine starting controller 10C shown in FIG. 7, the same components and functions as those of the turbine starting controller 10 according to the first embodiment are denoted by the same symbols and description thereof will be omitted.

In the turbine starting controller 10C, the optimum starting control correcting means 30 independent from the optimum starting controlling means 17 (17A, 17B) of the turbine starting controller 10 (10A, 10B) described above is added.

In the turbine starting controller 10C according to the fourth embodiment, the constraint conditions specific to a power plant, which cannot be readily taken into account in the optimization calculation process by the optimum starting controlling means 17, are independently represented as the optimum starting control correcting means 30, thereby executing the optimum turbine starting control that takes into account the constraint conditions specific to the power plant.

According to the turbine starting controller 10C, on the basis of the constraint conditions concerning startup specific to the power plant, which have not been taken into account in the optimization calculation process by the optimum starting controlling means 17, the optimum turbine acceleration rate/ optimum load increase rate as the optimum manipulated variable output by the optimum starting controlling means 17, or the starting schedule, is changed through control by the optimum starting control correcting means 30.

FIG. 8 shows an example of correction logic used in the optimum starting control correcting means 30 provided independently from the optimum starting controlling means 17.

The steam turbine 11 is subject to the constraint condition that, in order to avoid an increase in vibration at its mechanical resonance point, the HOLD on the turbine rpm be prohibited at rpm regions near the resonance point (critical rpm region) (the rpm region of, for example, 900 rpm to 3300 rpm when the rated rpm is 3600 rpm), and that at the critical rpm region, the rpm must be increased at a fixed turbine acceleration rate or more.

In the steam turbine 11, at the passage of the critical rpm upon turbine start, as compared with when at rpm regions other than this rpm region, a more stringent condition applies with respect to the turbine acceleration rate as the optimum variable in that the thermal stress is suppressed equal to or less than a prescribed value.

In the case of the turbine starting controller 10 according to the first embodiment as well, the optimization calculation process of the optimum starting controlling means 17 also incorporates constraint conditions relating to the turbine acceleration in the form of switching of the lower limit value of the manipulated variable.

However, when the constraint conditions relating to turbine acceleration are strictly incorporated into the optimization calculation process of the optimum starting controlling means 17, the lower limit switching condition for the manipulated variable becomes a function of the manipulated variable itself, so that the computational complexity increases, which adds significant difficulty to the processing of the optimization problem.

In the turbine starting controller 10C shown in FIGS. 7 and 8, in order for the constraint conditions concerning turbine acceleration to be reflected in the turbine starting control, the optimum starting control correcting means 30 is independently provided on the output side of the optimum starting controlling means 17, and the "CRITICAL SPEED PERMIT" condition is configured as shown in FIG. 8A by the optimum starting control correcting means 30.

The determination on the "CRITICAL SPEED PERMIT" condition is made immediately before the passage of the critical rpm region. As shown in FIG. 8A, when permitted, the turbine acceleration is continued as it is, and when not permitted, the turbine rpm is put on HOLD at a state before it reaches the critical rpm region until the permission conditions are met.

Similarly, in low load ranges from immediately after the incorporation of the generator 15 to initial load, in correspondence with the constraint condition for prohibiting the HOLD on the load increase in view of the instability immediately after the incorporation of the generator, the generator system incorporation permitting condition, that is, the so-called "52G ON PERMIT" condition shown in FIG. 8B, is constituted as the optimum starting control correcting means 30.

In the turbine starting controller 10C, the optimum starting control correcting means 30 is provided on the output side of the optimum starting controlling means 17, and on the basis of the constraint conditions relating to start-up specific to the power plant, the starting schedule including the optimum turbine acceleration rate/optimum load increase rate and the like (as the optimum operating conditions) calculated by the optimum starting controlling means 17 is corrected by the optimum starting control correcting means 30 for modification control, thereby performing final turbine starting control.

Thus, the constraint conditions specific to the power plant, which cannot be readily taken into account in the optimization calculation process of the optimum starting controlling means 17 of the turbine starting controller 10C, are taken into account by the optimum starting control correcting means 30 that is independently provided, and the optimum starting control correcting means 30 corrects the optimum manipulated variables (the optimum turbine acceleration rate and the optimum load increase rate) from the optimum starting controlling means 17 on the basis of the constraint conditions specific to the power plant before outputting them to the rpm/load controlling means 18 (see FIG. 1) as the final optimum manipulated variables.

As described above, the optimum starting control correcting means 30 is provided independently on the output side of the optimum starting controlling means 17, and the starting schedule including the optimum turbine acceleration rate/optimum load increase rate and the like output from the optimum starting controlling means 17 is corrected and subjected to modification control on the output side thereof by the optimum starting control correcting means 30 based on the constraint conditions specific to the power plant, whereby turbine starting control that takes into account the constraint conditions specific to the power plant can be realized.

While the above embodiments of the turbine starting controller according to the present invention are directed to the example in which the turbine starting controller is applied to the starting of the steam turbine, the turbine starting controller is also applicable to a gas turbine, and also to a combined-cycle power plant. When the present invention is to be applied to a gas turbine instead of a steam turbine, the combustion flow rate or gas temperature is used as the plant state variable instead of the main steam flow rate or main steam temperature.

This application claims priority from Japanese Patent Application 2005-074344, filed Mar. 16, 2005, which is incorporated herein by reference in its entirety.

What is claimed is:

1. A turbine starting controller for adjusting and controlling an amount of steam or gas flowing into a turbine using a control valve, comprising:
    an optimum starting controlling unit configured to:
        predict a heat transfer rate in a prediction period based on a directly manipulated variable,
        predict a rate of change of a first stage metal temperature in the prediction period based on the predicted heat transfer rate and a measured first stage metal temperature at a current time,
        predict thermal stress generated in a turbine rotor over the prediction period from a current time to a future,
        calculate, for each control period, a manipulated variable optimum transition pattern in the prediction period which makes a turbine starting time shortest while keeping the predicted thermal stress equal to or lower than a prescribed value,
        determine, as an actual optimum manipulated value, a value at the current time in the manipulated variable optimum transition pattern,
        directly feedback a turbine acceleration rate pattern and a load increase rate pattern, determined when the manipulated variable optimum transition pattern is calculated, to where the heat transfer rate in the prediction period is predicted; and
    an rpm/load controlling unit to which the optimum manipulated variable from the optimum starting controlling unit is input, for controlling actuation of the control valve.

2. The turbine starting controller according to claim 1, wherein the optimum starting controlling unit includes:
    a heat transfer rate predicting element for predicting the heat transfer rate over the prediction period from the current time to the future, with the directly manipulated variable of a turbine acceleration rate/load increase rate being taken as a variable;
    a first stage metal temperature predicting element for predicting the rate of change of the first stage metal temperature in the prediction period on the basis of the predicted heat transfer rate from the heat transfer rate predicting element and the measured first stage metal temperature at the current time;
    a thermal stress predicting element for predicting the thermal stress generated in the turbine rotor on the basis of the predicted rate of change of the first stage metal temperature from the first stage metal temperature predicting element; and
    an optimization calculating element for calculating, for each control period, the manipulated variable optimum transition pattern in the prediction period which makes the turbine starting time shortest while keeping the predicted thermal stress equal to or lower than the prescribed value under a constraint of operating conditions of a power plant wherein the optimization calculating element is configured to determine as the actual optimum manipulated variable the value at the current time in the manipulated variable optimum transition pattern.

3. The turbine starting controller according to claim 2, wherein the optimum starting controlling unit further includes a first stage steam temperature predicting element for predicting a first stage steam temperature over the predetermined prediction period from the current time to the future.

4. The turbine starting controller according to claim 2, wherein the optimum starting controlling unit is configured to form a closed optimization calculation cycle composed of the heat transfer rate predicting element, the first stage metal temperature predicting element, the thermal stress predicting element, and the optimization calculating element, and wherein the optimization calculating element is configured to output the manipulated variable at the current time in the manipulated variable optimum transition pattern to the rpm/load controlling unit as an optimum turbine acceleration rate/optimum load increase rate.

5. The turbine starting controller according to claim 2, wherein the optimization calculating element included in the optimum starting controlling unit is configured to assume that the turbine acceleration rate/load increase rate in the prediction period is constant, thereby reducing the number of variables for optimization calculation by the optimization calculating element.

6. The turbine starting controller according to claim 2, wherein the optimum starting controlling unit includes a heat transfer rate prediction model modifying element for adapting a heat transfer rate prediction model, which is based on the manipulated variable in the thermal stress predicting element, on the basis of a measured plant value for each control period.

7. The turbine starting controller according to claim 6, further comprising an optimum starting control correcting element provided on an output side of the optimum starting controlling unit, wherein the optimum starting control correcting element is set to receive an input of plant constraint conditions that are not taken into account by the optimum starting controlling unit under the constraint of power plant operating conditions, and correct the optimum manipulated variable calculated by the optimum starting controlling unit or a plant starting schedule.

8. A turbine starting control method for adjusting and controlling an amount of steam or gas flowing into a turbine using a control valve, comprising:
a heat transfer rate predicting step of predicting a heat transfer rate in a prediction period on the basis of the manipulated variable in an optimization process;
a first stage metal temperature predicting step of predicting a first stage metal temperature in the prediction period from the predicted heat transfer rate and a measured first stage metal temperature;
a thermal stress predicting step of predicting, with respect to an assumed manipulated variable, a thermal stress generated in a turbine rotor over the prediction period from a current time to the future;
an optimization calculation step of calculating for each predetermined control period a manipulated variable optimum transition pattern while keeping the predicted thermal stress equal to or lower than a prescribed value under a constraint of plant operating conditions;
directly feeding back a turbine acceleration pattern and a load increase rate pattern, determined in the optimization calculation step, to the heat transfer rate predicting step,
wherein in the optimization calculation step, a value at the current time in the manipulated variable optimum transition pattern is determined as an actual optimum manipulated variable.

9. The turbine starting control method according to claim 8, wherein the optimization calculation step of calculating the manipulated variable optimum transition pattern for each predetermined control period from the predicted thermal stress is repeated, forming an optimization calculation cycle.

10. The turbine starting control method according to claim 8, wherein the heat transfer rate predicting step includes a prediction model correcting step of adapting a heat transfer rate model, which is based the manipulated variable, on the basis of a measured plant value for each control period.

11. The turbine starting control method according to claim 8, wherein the optimization calculation step includes the step of assuming the manipulated variable in the prediction period is constant, thereby reducing the number of variables for the optimization calculation step.

* * * * *